United States Patent [19]

Tinning

[11] 4,372,733
[45] Feb. 8, 1983

[54] BUILDING CONSTRUCTION

[76] Inventor: Robert C. Tinning, 7430 Pyramid Pl., Los Angeles, Calif. 90046

[21] Appl. No.: 935,114

[22] Filed: Aug. 21, 1978

[51] Int. Cl.$^3$ .............................................. B29C 5/02
[52] U.S. Cl. .................................... 425/60; 264/32; 264/33; 425/63
[58] Field of Search ................... 264/32, 33, 333, 297; 425/60, 63

[56] References Cited

U.S. PATENT DOCUMENTS

| | | | |
|---|---|---|---|
| 2,877,530 | 3/1959 | Winn | 264/32 |
| 3,206,899 | 9/1965 | Wright | 264/32 |
| 3,417,429 | 12/1968 | Wright | 425/60 |
| 3,600,773 | 8/1971 | Davis | 425/63 |
| 3,922,124 | 11/1975 | Bjorhaag | 425/64 |
| 3,923,573 | 12/1975 | Hay | 264/32 |
| 4,067,941 | 1/1978 | Gaudelli | 264/297 |

*Primary Examiner*—John A. Parrish
*Attorney, Agent, or Firm*—Poms, Smith, Lande & Rose

[57] ABSTRACT

A concrete building is constructed by initially forming a generally circular concrete pad. A spherical or slighly more than hemispherical plastic mold is then erected on the concrete pad with a central post extending axially out the central top of the mold. Barbed wire is then wrapped around the mold and wire mesh is subsequently wrapped around the mold on top of the barbed wire, with the barbed wire serving to space the reinforcing wire mesh away from the surface of the mold. Concrete is then applied to the outside of the mold starting at the bottom of the mold adjacent the concrete pad and moving helically up the surface of the mold while laying concrete around the mold in strips. The apparatus for applying the concrete includes a frame mounted on wheels and pivoted on the post extending out of the top of the mold and being curved to follow the exterior surface of the mold. Mounted on the frame is a hopper arrangement for feeding concrete against the mold and for automatically smoothing it into place on the outer surface of the mold with the barbed wire and the wire mesh concrete reinforcing being embedded in the two inch thick layer of concrete. A motor is provided for feeding the hopper and concrete dispensing and smoothing apparatus up the movable frame as the frame is rotated around the surface of the mold, to form the exterior of a concrete building.

9 Claims, 5 Drawing Figures

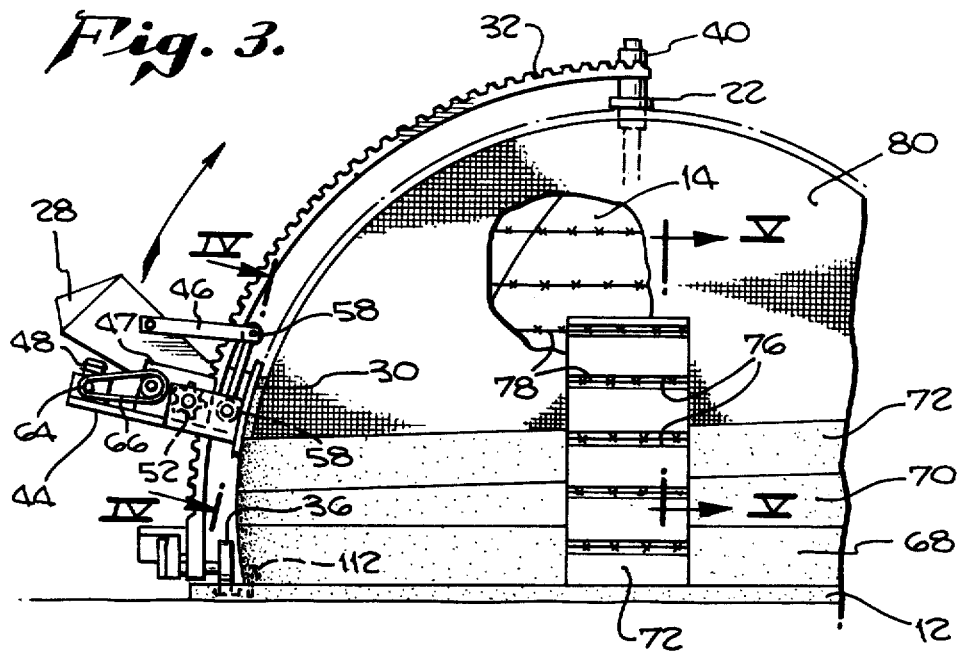
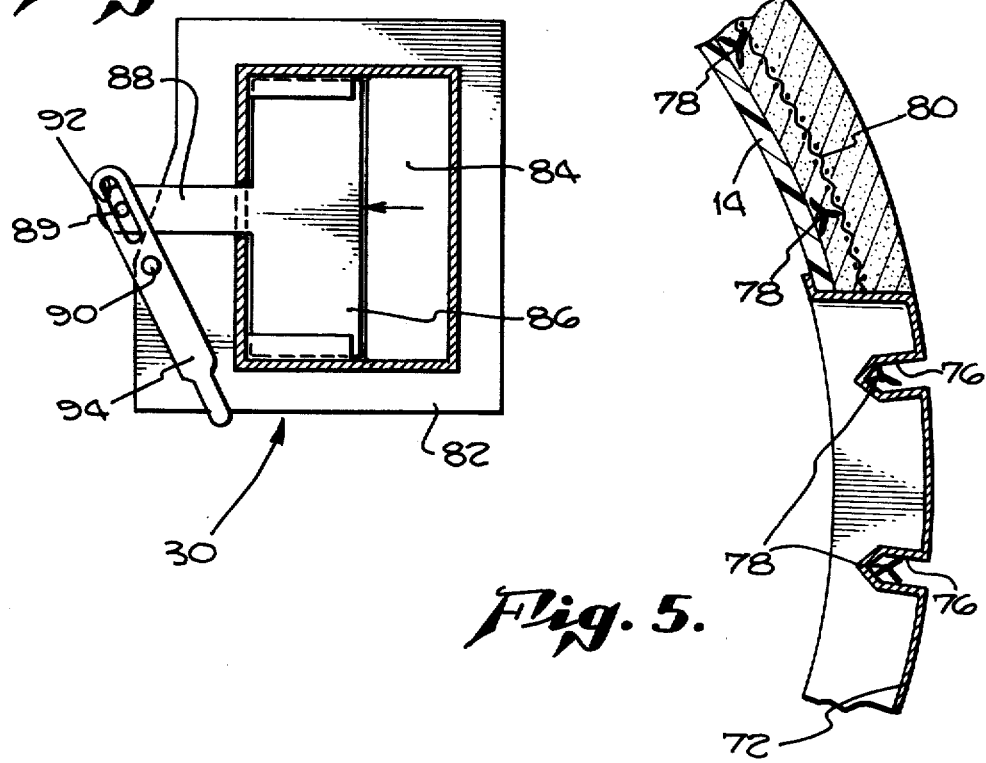

4,372,733

BUILDING CONSTRUCTION

FIELD OF THE INVENTION

This invention relates to building construction techniques.

BACKGROUND OF THE INVENTION

It has previously been proposed to make buildings of generally spherical configuration, or of a configuration which is somewhat more than a hemisphere, and these buildings have been formed of reinforced plastic or the like. However, the buildings which have been constructed of sections of plastic material have in certain cases been of insufficient strength or durability.

Accordingly, a principal object of the present invention is to construct buildings of this general configuration out of concrete in a simple and inexpensive manner.

SUMMARY OF THE INVENTION

In accordance with the present invention, a concrete structure is formed by initially erecting a mold which has an exterior surface which is a surface of revolution, such as a sphere. Metal concrete reinforcing material is then located on the outer surface of the mold and spaced therefrom. Concrete is subsequently applied to the mold by feeding the concrete smoothly and uniformly in strips around the outer surface of said mold, starting at the bottom and progressing upward toward the top, with the concrete being laid in strips, one above the other or in a helical pattern.

In accordance with a collateral aspect of the invention, an initial circular base may be provided which is slightly greater in diameter than the intended diameter of the final structure. In addition, a central post may be erected within the mold and a framework provided to rotate about the post and around the mold on wheels which rest on the outer edge of the base extending outside of the mold and the desired location of the outer concrete wall. A hopper and concrete feeding and smoothing apparatus is mounted on the movable frame so that it can be progressively moved up the frame while the entire frame is being rotated around the structure, thereby embedding the reinforcing mesh or wire in the exterior layer of concrete.

The concrete feeding apparatus may be provided with a vertical slot through which the concrete material is fed onto the outer surface of the mold, and a broad plate extends around the concrete feeding slot to smooth and configure the concrete to the desired spherical surface shape of the building.

Regarding a subordinate feature of the invention, openings for doors and windows may be provided through the use of "outsets" which extend outwardly from the mold by a distance equal to the desired thickness of the outer concrete wall, normally about two inches. Further, these "outsets" may be provided with tranverse grooves to accommodate the continuous wrapping of the barbed wire around the structure preparatory to the outer layer of wire mesh employed for concrete reinforcing.

Concerning another collateral aspect of the invention, the concrete hopper and feed mechanism may be moved up along the surface of the mold on the frame in any desired manner, either manually or through a motor. Preferably, the outer surface of one of the frame members may be provided with continuous rack-type teeth and the hopper and concrete feed assembly may be provided with a matching gear box, by which the hopper and concrete feeding assembly may be moved upwardly along the outer surface of the mold as the frame is rotated around the mold. Also, the entire frame may either be rotated around the mold manually, or through mechanical means which may be operated in synchronism with the upward movement of the hopper and concrete feed assembly. This concurrent movement may be accomplished by a direct mechanical linkage, or through the use of synchronous electrical motors, when the drives are operated electrically.

With regard to an additional subordinate feature of the invention, the pad may be provided with a step, or a groove, to control the movement of the wheels on the frame and keep it in a desired path relative to the mold, as well as providing additional latitude to start the concrete layer at a point slightly above the portion of the pad on which the frame supporting wheels rest.

The present invention has the capability of providing inexpensive and secure structures at a minimum cost. Further, these concrete structures have a degree of permanence and solidarity which is not found in conventional wood frame structures, nor in the prior plastic versions of the spherical buildings which have previously been proposed.

Other objects, advantages, and features of the invention will become apparent from a consideration of the following detailed description and from the accompanying drawings.

BRIEF DESCRIPTION OF THE DRAWINGS

FIGS. 2 and 3 are side views taken from different angles, showing the apparatus for constructing the concrete building, and with the building partially complete;

FIG. 4 is a schematic showing of a valve mechanism to control concrete flow; and FIG. 5 is an enlarged cross-sectional view showing the barbed wire and wire mesh embedded in concrete on the exterior of the mold, adjacent an "outset".

DETAILED DESCRIPTION

Figure 1:
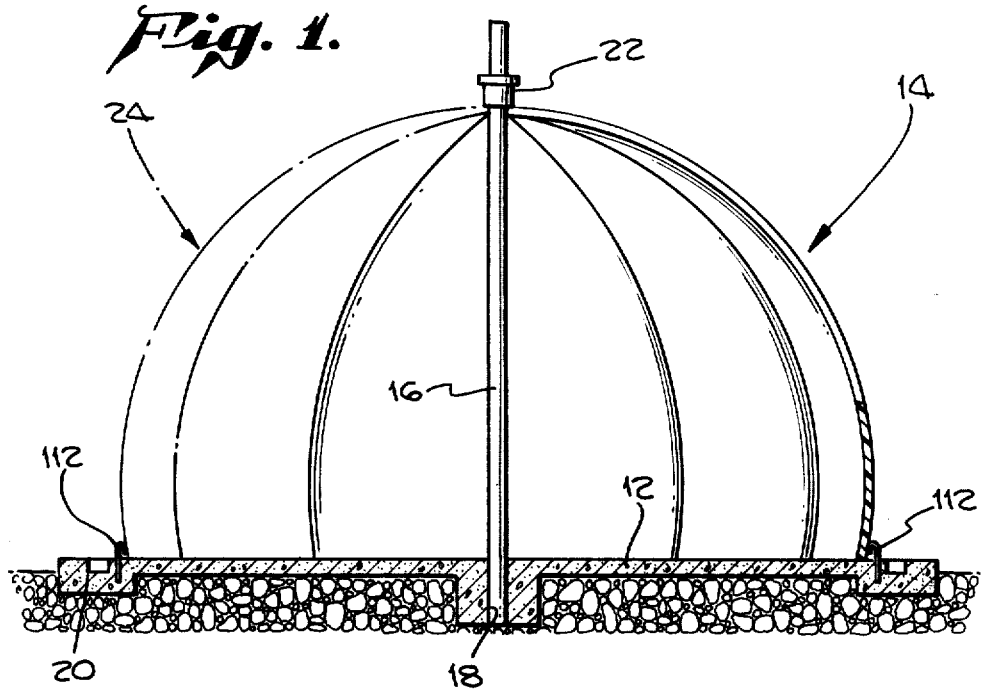
FIG. 1 is a partial cross-sectional view of the base for the building of the present invention, and of the mold partially installed.

Referring more particularly to the drawings, FIG. 1 shows a base 12 for the concrete structure, and also shows certain sections of the mold 14 which are being installed around a central post 16 which is secured vertically in a central opening 18 in the concrete base 12. It may be noted that the outer rim of the base 12 is provided with a circular recess 20 which is employed as a guide for the cement dispensing apparatus to be described below. The mold 14 is made up of a number of segments, each of which forms a part of the spherical shell of the mold, and which are of sufficiently narrow width that they may be subsequently removed through a seven-foot door which is formed in the cement structure as it is being constructed. When a building which is 20-foot in diameter, is employed, 12 segments are used for the mold, and each of these segments is approximately 5.235 feet in width. It may also be noted that, with a 20-foot diameter building, the center of the sphere is located ½ feet above the concrete pad 12, so that the height of the structure is approximately 12 feet.

Near the top of the central post 16 is a collar 22 to which the mold segments may be secured, and which also serves to support the cement hopper and dispensing mechanism as discussed below. In FIG. 1 only a few of the rear fiberglass mold sections 14 have been shown. Others will be added until the spherical shape indicated by the dashed lines 24 is achieved. Further, additional segments will be included toward the front of the structure to form a complete mold which is slightly more than hemispherical in shape.

Figure 2:
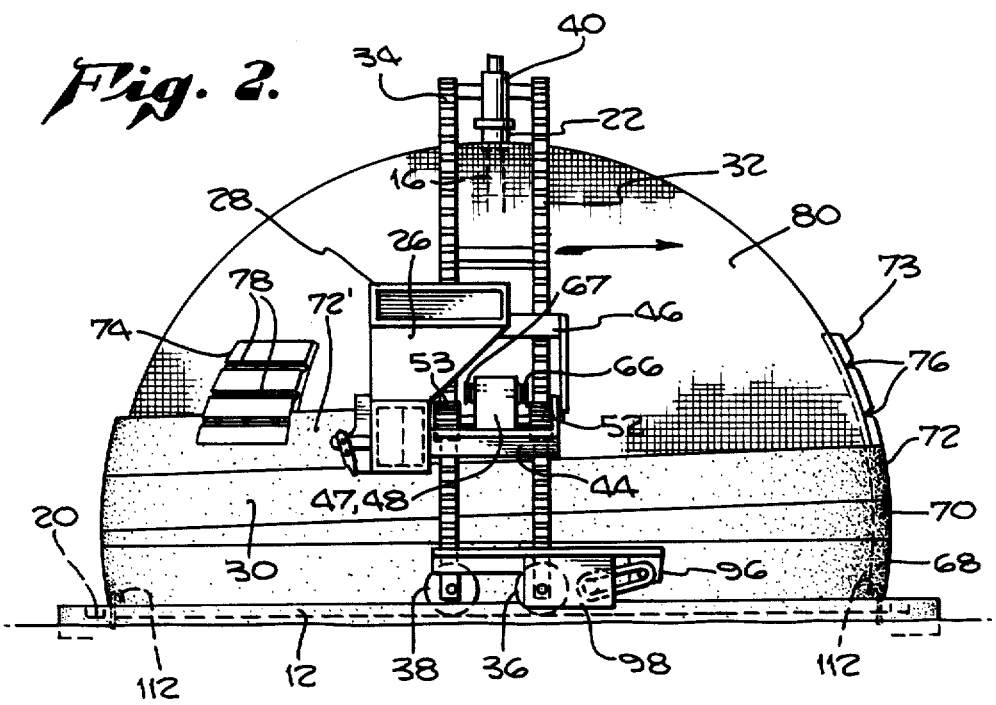

FIG. 2 shows the concrete structure under construction, with concrete being dispensed from the assembly 26 which includes the concrete hopper 28 and the dispensing and spreading sub-assembly 30. The cement dispensing assembly 26 includes the two principal support members 32 and 34 which are mounted on wheels 36 and 38, respectively, which ride in the groove 20 in the concrete pad 12. At the top the two support members 32 and 34 are supported by the cylindrical sleeve 40 which rests on the collar 22 secured to the vertical post 16. The two supports 32 and 34 are provided with gear teeth of the rack type, so that mating gears on the movable assembly including the concrete hopper 28 and dispenser 30, may engage the teeth and move the cement hopper and dispensing assembly up to progressively apply concrete to the outer surface of the mold elements 14 from the base 12 up to close to the central post 16.

FIG. 3 shows a side view of the hopper 28 and the dispenser assembly 30 mentioned above, as well as the curved support 32 which extends between the wheel 36 riding in the groove 20 in the base 12, and the sleeve 40 which rests on the collar 22 which is secured to the central post 16. As shown in both FIGS. 2 and 3, a platform 44 is mechanically secured to the hopper 28 by a brace 46, and the platform 44 supports a gear box 47 which is driven by a motor 48 which may be either a gas driven motor or an electric motor. As schematically shown in FIGS. 2 and 3, the racks 32 and 34 are provided with teeth which are engaged by gears 52 and 53 driven by gear box 47 to slowly move the hopper 28 and the concrete dispenser subassembly 30 up the exterior of the mold assembly as concrete is being poured. Incidentally, concrete may be applied to the hopper 28 through an elongated flexible tube, in a manner known in the art.

To assure positive and firm support of the assembly including hopper 28, platform 44, and subassembly 30, two small wheels 58 are mounted to engage the side of the support 32 toward the mold 14. Incidentally, the gear box 47 may be driven in any suitable manner from the motor 48, for example, by the pulley 64 and the belt 66.

For smoothing the concrete as it is dispensed, the substantial extending portion of the assembly 30 is vibrated, and this may be accomplished by eccentric 67 mounted on the shaft of motor 48. Alternatively, if a gasoline motor is employed, it has sufficient inherent vibration, that the eccentric would not be needed.

In FIG. 2 the cement hopper 28 and the applicator 30 are shown at an intermediate elevation, and concrete strips 68, 70, 72, and 72' have been applied to the mold 14, with strip 72' being in the process of being applied. It may be noted that the lowermost strip 68 is of uniform with, perhaps one to one and one-half feet, and that the next strip 70 is of gradually increasing width from left to right as the continuous upward movement of the hopper 28 and the applicator subassembly 30 is initiated. Again, the strip 72 and 72', which is a continuation of the helical strip 70 is of full width, and such full width strip continues in an uninterrupted manner, except for the doors and windows, up to near the top of the entire construction.

Incidentally, with regard to doors and windows, as mentioned above, suitable "outsets" 73 and 74 for a door and a window, respectively, are shown in FIG. 2. As mentioned above, the outsets are of substantially the same thickness as the ultimate layer of concrete, so that the applicator 30 merely slides over these "outsets". Each of the outsets is provided with grooves 76 of substantial depth so that the barbed wire 78 may be maintained under tension and continuously wrapped around the entire structure. At a later stage, after the concrete has set, the barbed wire may be severed adjacent the outsets 72 and 74, for example, and the outsets may be removed along with the inner mold elements to which they are individually secured. Subsequently, window and door frames may be secured in the openings left by the outsets following their removal. Incidentally, the plastic mold is removed through the opening which remains after the outset 72 has been removed. It may also be noted that FIG. 5 is a broken away cross-sectional view showing the fiberglass plastic mold element 14, the barbed wire 78 and the wire mesh 80, which is spaced away from the mold 14 so that it will surely be embedded within the concrete layer to be applied to the exterior of the mold.

FIG. 4 is a schematic showing of one form of valve for the cement-dispensing subassembly 30 as shown in FIG. 2, for example. In FIG. 4, the plate 82 which makes engagement with the concrete material is provided with a rectangular, vertically-extending slot 84 through which the concrete is applied to the mold. The sliding plate 86 is moved laterally to block flow from the opening 84. The lateral movement of the plate 86 may be accomplished in any desired manner, for example, by the extension 88 from plate 86 and lever 94 which is pivoted at 90 and engages extension 88 by the pin and slot mechanism 89,92.

As shown in FIGS. 2 and 3, the curved supports 32 and 34 are supported directly by the wheels 36 and 38. If desired, the entire assembly may be pushed by workmen and moved peripherally in synchronism with the flow of concrete from the hopper 28 through the dispensing assembly 30. Alternatively, the wheel 36 may be driven by motor 96 through gear box 98. The drive shaft for wheel 36 extends through the lower end of frame member 86 and the support plate 100 for the motor 96 and gear box 98. The wheel 36 may be decoupled from gear box 98 by any desired mechanism, such as a sliding spline, to permit rotation of the frame assembly manually. Also, gear boxes 47 and 98 may be intercoupled with a flexible shaft, if desired, to insure synchronous movement of the frame around the mold while the dispenser is moving up the building form. This may also be accomplished by the use of synchronous electric motors 48 and 96, with electrical lines extending from the upper center of mold 14 near the central post 16, along the frame members 32 and 34.

Through the use of the track 20 to guide the wheels 36 and 38, the entire support structure 32 and 34 is accurately positioned, so that the tolerances and thickness of the concrete is held to less than one-quarter of an inch departure from the desired two-inch thickness of the wall. It is also necessary to accurately position the mold structure 14 to ensure accurate thickness of the concrete layer. This may, if desired, be accomplished by the use of metal loops 112, which are located just outside the desired position of the plastic mold. These loops may provide the dual function of accurately positioning the plastic mold 14, and also interlocking the pad 12 with the concrete wall which is formed on it. Of course, if it is desired to permit subsequent relocation of the reinforced concrete buildings, these metal loops 112 could be omitted.

In conclusion, it is to be understood that the embodiment disclosed and described in the foregoing specification are merely illustrative of principles of the invention. Minor modifications, or the use of alternative constructions and mechanical mechanisms are within the scope of the present invention. Thus, by way of example and not of limitation, the building could be somewhat ellipsoidal in configuration, rather than precisely spherical; the mold could be made of a material other than fiberglass reinforced plastic; different mechanical drive mechanisms for the concrete hopper, and for the supporting wheels of the movable assembly could be employed; and somewhat different dimensions than the specific dimensions set forth in the specification, may of course be used. Accordingly, the present invention is not limited to that precisely as illustrated.

What is claimed is:

1. An apparatus for constructing concrete buildings comprising:
    a removable mold forming a surface of revolution having a central axis and having a form defining the desired configuration of a concrete structure;
    a support post mounted at said central axis;
    an assembly including a concrete dispenser and local concrete storage means for supplying concrete to said dispenser; and
    means including a movable frame for mounting said concrete dispenser for movement peripherally around said mold and progressively from the bottom to the top of said mold for applying concrete in strips over substantially the entire exterior surface of said mold, to form a thick wall of concrete on the outer surface of said mold, said mounting means including means for supporting said assembly substantially independent of the concrete wall being formed.

2. An apparatus as defined in claim 1 further comprising means for smoothing the surface of said concrete as it is applied to said mold, including an extended plate surrounding the opening through which the concrete is dispensed onto said mold, said plate having a surface facing said mold having a curvature substantially corresponding to that of said mold.

3. An apparatus as defined in claim 1 further comprising means for moving said concrete dispenser relative to said frame, and external to the mold, up said frame and for concurrent and synchronously moving said frame around said mold to apply the concrete to said mold substantially in a helical strip.

4. An apparatus as defined in claim 1 wherein said movable frame is provided with gear teeth extending along at least the major portion of its length from the bottom to the top of said mold all external to said mold, and wherein means including mating gears are secured to said concrete dispenser for moving said dispenser upward along the surface of, but spaced from, said mold.

5. An apparatus as defined in claim 1 further comprising:
    means for smoothing the surface of said concrete as it is applied to said mold; and
    means for vibrating said smoothing means to improve the smoothing action.

6. An apparatus as defined in claim 1 further comprising outset means included in said removable mold for forming openings in said concrete wall by blocking the formation of the concrete wall where the outsets are located.

7. An apparatus as defined in claim 1 further comprising track means independent of said concrete wall for guiding said mounting means as it is moved peripherally around the mold.

8. An apparatus for constructing concrete buildings comprising:
    a removable mold forming a surface of revolution having a central axis;
    a support post mounted at said central axis;
    an assembly including concrete dispenser and an open hopper for storing concrete;
    means including a movable frame for mounting said assembly for movement peripherally around and exterior to said mold and progressively from the bottom to the top of said mold for applying concrete in strips over substantially the entire exterior surface of said mold, to form a thick wall of concrete on the outer surface of said mold, said mounting means sustaining substantially all of the weight of said assembly and the concrete independent of the concrete wall;
    means for smoothing the surface of said concrete as it is applied to said mold, including an extended plate surrounding the opening through which the concrete is dispensed onto said mold, said plate having a surface facing said mold having a curvature substantially corresponding to that of said mold;
    means for vibrating said smoothing means to improve the smoothing action; and
    means for moving said concrete dispenser up said frame and for concurrent and synchronously moving said frame around said mold to apply the concrete to said mold substantially in a helical strip.

9. An apparatus as defined in claim 8, wherein said movable frame is provided with gear teeth extending along at least the major portion of its length from the bottom to the top of said mold, and wherein means including mating gears are secured to said concrete dispenser for moving said dispenser upward along the surface of, but spaced from, said mold.

* * * * *